(12) United States Patent
Yang et al.

(10) Patent No.: US 7,103,225 B2
(45) Date of Patent: Sep. 5, 2006

(54) CLUSTERING APPEARANCES OF OBJECTS UNDER VARYING ILLUMINATION CONDITIONS

(75) Inventors: Ming-Hsuan Yang, San Jose, CA (US); Jeffrey Ho, Mountain View, CA (US)

(73) Assignee: Honda Motor Co., Ltd., Tokyo (JP)

(*) Notice: Subject to any disclaimer, the term of this patent is extended or adjusted under 35 U.S.C. 154(b) by 17 days.

(21) Appl. No.: 10/703,294

(22) Filed: Nov. 6, 2003

(65) Prior Publication Data

US 2004/0151384 A1 Aug. 5, 2004

Related U.S. Application Data

(60) Provisional application No. 60/425,213, filed on Nov. 7, 2002, provisional application No. 60/478,219, filed on Jun. 12, 2003.

(51) Int. Cl.
*G06K 9/62* (2006.01)
*G06K 9/00* (2006.01)

(52) U.S. Cl. .................................. 382/225; 382/118
(58) Field of Classification Search ........... 382/225, 382/224, 181, 190, 206, 118; 707/6, 100
See application file for complete search history.

(56) References Cited

U.S. PATENT DOCUMENTS

2002/0097914 A1 7/2002 Yaung .................... 382/225

OTHER PUBLICATIONS

Bellhumeur, P.N. et al., "What is the Set of Images of an Object Under All Possible Lighting Conditions?" Computer Society Conference on Computer Vision and Pattern Recognition. Jun. 18-20, 1996 pp. 270-277.*

Adini, Y. et al., "Face Recognition: The Problem of Compensating for Changes in Illumination Direction," IEEE Transactions on Pattern Analysis and Machine Intelligence, vol. 19, No. 7, Jul. 1997, pp. 721-732.

Basri, R. et al., "Lambertian Reflectance and Linear Subspaces," Proceedings of the International Conference On Computer Vision, IEEE Computer Society, vol. 2, 2001, pp. 383-390.

Basri, R. et al., "Clustering Appearances of 3D Objects," Proceedings IEEE Conference on Computer Vision and Pattern Recognition, 1998, pp. 414-420.

Batur, A.U. et al., "Linear Subspaces for Illumination Robust Face Recognition," Proceedings of the 2001 IEEE Computer Society Conference on Computer Vision and Pattern Recognition, vol. 2, Dec. 8-14, 2001, pp. 296-301.

(Continued)

*Primary Examiner*—Wenpeng Chen
(74) *Attorney, Agent, or Firm*—Fenwick & West LLP; Mark Duell (57) ABSTRACT

Taking a set of unlabeled images of a collection of objects acquired under different imaging conditions, and decomposing the set into disjoint subsets corresponding to individual objects requires clustering. Appearance-based methods for clustering a set of images of 3-D objects acquired under varying illumination conditions can be based on the concept of illumination cones. A clustering problem is equivalent to finding convex polyhedral cones in the high-dimensional image space. To efficiently determine the conic structures hidden in the image data, the concept of conic affinity can be used which measures the likelihood of a pair of images belonging to the same underlying polyhedral cone. Other algorithms can be based on affinity measure based on image gradient comparisons operating directly on the image gradients by comparing the magnitudes and orientations of the image gradient.

15 Claims, 6 Drawing Sheets

OTHER PUBLICATIONS

Belhumeur, P. et al., "Comparing Images Under Variable Illumination," Proc. IEEE Conf. CVPR, 1998, 8 pages.

Belhumeur, P.N. et al., "What is the Set of Images of an Object Under All Possible Illumination Conditions?", Int. Journal of Comp. Vision, vol. 28, No. 3, 1998, pp. 1-16.

Chen, Hansen F. et al., "In Search of Illumination Invariants," Proc. IEEE Conference on Computer Vision and Pattern Recognition, vol. 1, 2000, pp. 254-261.

Fitzgibbon, A. et al., "On Affine Invariant Clustering and Automatic Cast Listing in Movies," In Proc. European Conference on Computer Vision, 2002, pp. 304-320.

Gdalyahu, Y. et al., "Self-Organization in Vision: Stochastic Clustering for Image Segmentation, Perceptual Grouping, and Image Database Organization," IEEE Transactions on Pattern Analysis and Machine Intelligence, vol. 23, No. 10, Oct. 2001, pp. 1053-1074.

Georghiades, A. S. et al. "From Few to Many: Illumination Cone Models for Face Recognition Under Variable Lighting and Pose," vol. 23, No. 6, Jun. 2001, pp. 643-660.

Jain, A. K. et al., "Data Clustering: A Review," ACM Computing Surveys, vol. 31, No. 3, Sep. 1999; 264-323.

Lee, D. D. et al., "Learning the Parts of Objects by Non-Negative Matrix Factorization," Nature, vol. 401, Oct. 21, 1999, pp. 788-791.

Lee, Kuang-Chih et al., "Nine Points of Light: Acquiring Subspaces for Face Recognition Under Variable Lighting," IEEE Conference on Computer Vision and Pattern Recognition, Dec. 2001, vol. 1, pp. 1-8.

Murase, H. et al. "Visual Learning and Recognition of 3-D Objects From Appearance," Int'l. J. Computer Vision, vol. 14, 1995, pp. 5-24.

NG, A. Y. et al., "On Spectral Clustering: Analysis and an Algorithm," Advances.

NG, A. Y. et al., "On Spectral Clustering: Analysis and an Algorithm," Advances in Neural Information Processing Systems 15, 2002, pp. 849-856.

Polito, M. et al., "Grouping and Dimensionality Reduction by Locally Linear Embedding," Advances in Neural Information Processing Systems 15, 2002, pp. 1255-1262.

Ramamoorthi, R. et al., "A Signal-Processing Framework for Inverse Rendering," Proc. Siggraph, 2001, pp. 117-128.

Roweis, S. T. et al., "Nonlinear Dimensionality Reduction by Locally Linear Embedding," Science, vol. 290, No. 5500, Dec. 22, 2000, pp. 2323-2326.

Shi, J. et al., "Normalized Cuts and Image Segmentation," IEEE Transactions on Pattern Analysis and Machine Intelligence, vol. 22, No. 8, Aug. 2000, pp. 888-905.

Sim, T. et al., "The CMU Pose, Illumination, and Expression (PIE) Database," IEEE International Conference on Automatic Face and Gesture Recognition, 2002, pp. 1-6.

Sim, T. et al., "Combining Models and Exemplars for Face Recognition: An Illuminating Example," CVPR 2001 Workshop on Models versus Exemplars in Computer Vision, 2001, 10 pages.

Weiss, Y. "Segmentation Using Eigenvectors: a Unifying View," Proceedings International Conference on Computer Vision, vol. 2, 1999, pp. 975-982.

Zheng, Q. et al., "Estimation of Illuminant Direction, Albedo, and Shape from Shading," IEEE Transactions on Pattern Analysis and Machine Intelligence vol. 13, No. 7, Jul. 1991; pp. 680-702.

PCT International Search Report, International Application No. PCT/US03/35554, Search Report Dated May 18, 2004, 5 pages.

* cited by examiner

SET OF IMAGES $I_N$ $I_1$ $I_2$ $I_3$ $I_4$ $I_5$ $I_6$ $I_7$ $I_8$ $I_9$ $I_{10}$ $I_{11}$ $I_{12}$ $I_{13}$ $I_{14}$ $I_{15}$ $I_{16}$ $I_{17}$ $I_{18}$ $I_{19}$ $I_{20}$ $I_{21}$ $I_{22}$ $I_{23}$ $I_{24}$ $I_{25}$

| $I_N$ | Mapping $f$ | $P_N \in R^s$ |
|---|---|---|
| $I_{aj} = \{I_{aa}, I_{ab}, I_{ac}, \ldots, I_{an}\}$ | ⟺ | $P_{aj} = \{P_{aa}, P_{ab}, P_{ac}, \ldots, P_{an}\}$ |
| $I_{bj} = \{I_{ba}, I_{bb}, I_{bc}, \ldots, I_{bn}\}$ | ⟺ | $P_{bj} = \{P_{ba}, P_{bb}, P_{bc}, \ldots, P_{bn}\}$ |
| ... | | ... |
| $I_{ij} = \{I_{ia}, I_{ib}, I_{ic}, \ldots, I_{in}\}$ | ⟺ | $P_{ij} = \{P_{ia}, P_{ib}, P_{ic}, \ldots, P_{in}\}$ |
| ... | | ... |
| $I_{mj} = \{I_{ma}, I_{mb}, I_{mc}, \ldots, I_{mn}\}$ | ⟺ | $P_{mj} = \{P_{ma}, P_{mb}, P_{mc}, \ldots, P_{mn}\}$ |

Multi-dimensional Image Space
$R^s$

*Figure 2*

SUBSET OF
IMAGES $I_c$ OF
SUBJECT 101c $I_{18}$ $I_7$ $I_8$ $I_{25}$ $I_{12}$

101c

MULTIDIMENSIONAL SPACE $R^s$

CLUSTERING APPEARANCES OF OBJECTS UNDER VARYING ILLUMINATION CONDITIONS

RELATED APPLICATIONS

This application is related to and claims priority to U.S. Provisional Application Ser. No. 60/425,213 entitled "Clustering Appearances of Objects Under Varying Illumination Conditions" filed on Nov. 7, 2002 by Ming-Hsuan Yang, et al. and U.S. Provisional Application Ser. No. 60/478,219, entitled "Clustering Appearances of Objects Under Varying Illumination Conditions" and filed on Jun. 12, 2003 by Ming-Hsuan Yang, et al., both of which are incorporated herein by reference in their entirety. This application is also related to co-pending U.S. patent application Ser. No. 60/478,644, entitled "Video-Based Face Recognition Using Probabilistic Appearance Manifolds," filed on Jun. 12, 2003 by Ming-Hsuan Yang, et al., which is incorporated herein by reference in its entirety.

FIELD OF THE INVENTION

The present invention relates generally to computer vision, more particularly to clustering images taken under varying illumination conditions.

BACKGROUND OF THE INVENTION

From the photography aficionado type digital cameras to the high-end computer vision systems, digital imaging is a fast growing technology that is becoming an integral part of everyday life. In its most basic definition, a digital image is a computer readable representation of an image of a subject taken by a digital imaging device, e.g. a camera, video camera, or the like. A computer readable representation, or digital image, typically includes a number of pixels arranged in an image file or document according to one of many available graphic formats. For example, some graphic file formats include, without limitation, bitmap, Graphics Interchange Format (GIF), Joint Photographic Experts Group (JPEG) format, and the like. A subject is anything that can be imaged, i.e. photographed, video taped, or the like. In general, a subject may be an object or part thereof, a person or a part thereof, a scenic view, an animal, or the like. An image of a subject typically comprises viewing conditions that, to some extent, make the image unique. In imaging, viewing conditions typically refer to the relative orientation between the camera and the object (i.e., the pose), and the external illumination under which the images are acquired.

Variation in viewing conditions have long been a challenge in the field of image clustering for computer vision. Particularly, clustering of three-dimensional (3-D) images according to the subject represented presents a difficult problem because images of the same subject under different viewing conditions can be drastically different. Conversely, images with similar appearance may originate from two very different subjects. The various viewing conditions can be isolated to present a different problem for clustering purposes. One such problem subset can be the clustering problem for images taken under varying illumination conditions with the subject in fixed pose. This problem is difficult because images of the same subject may look drastically different under different lighting, while different subjects may appear similar under different illumination conditions.

Figure 1A:
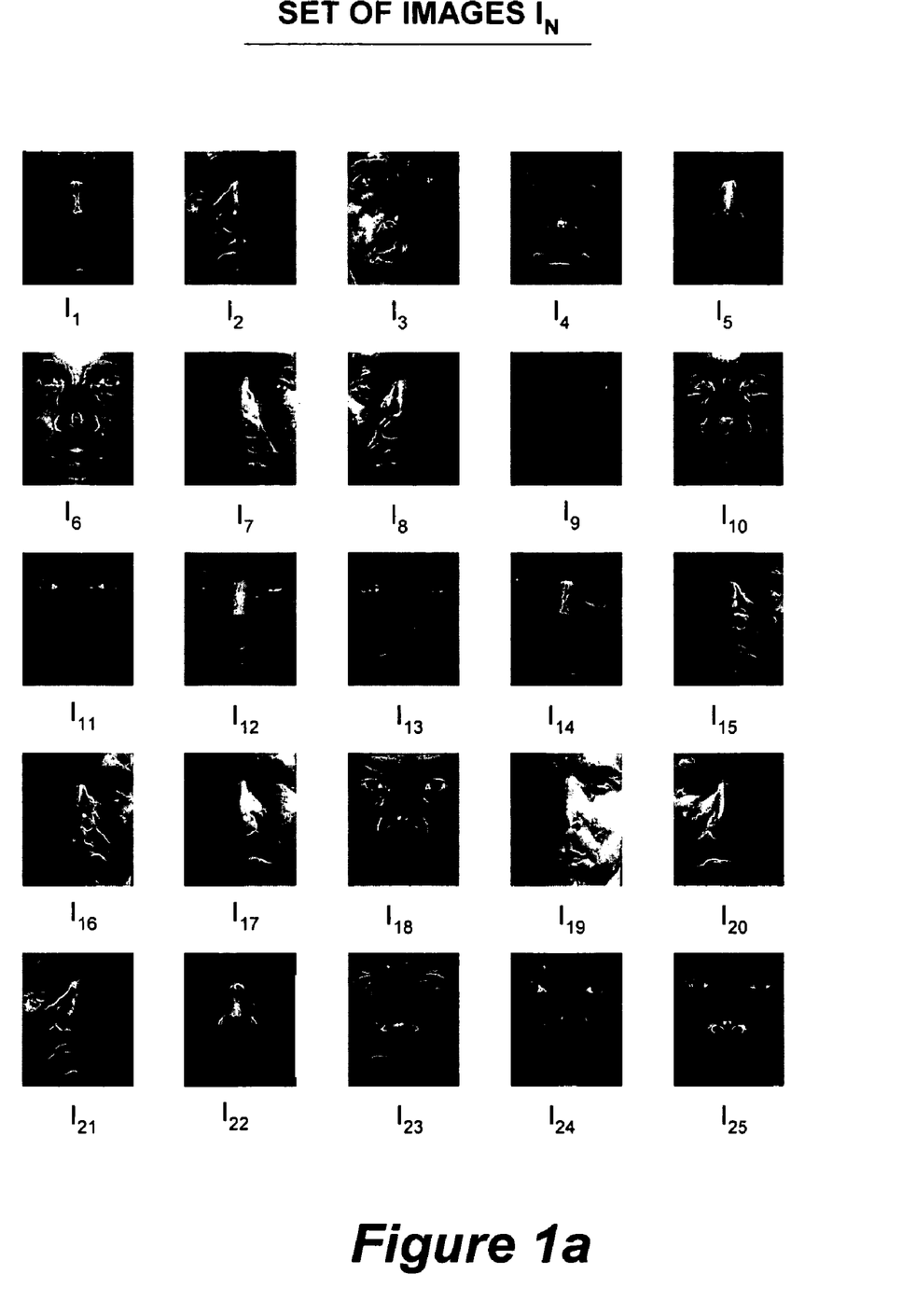
FIG. 1a shows a sample set of images of various subjects on a fixed pose but each subject shown under varying illumination conditions.
Figure 1B:
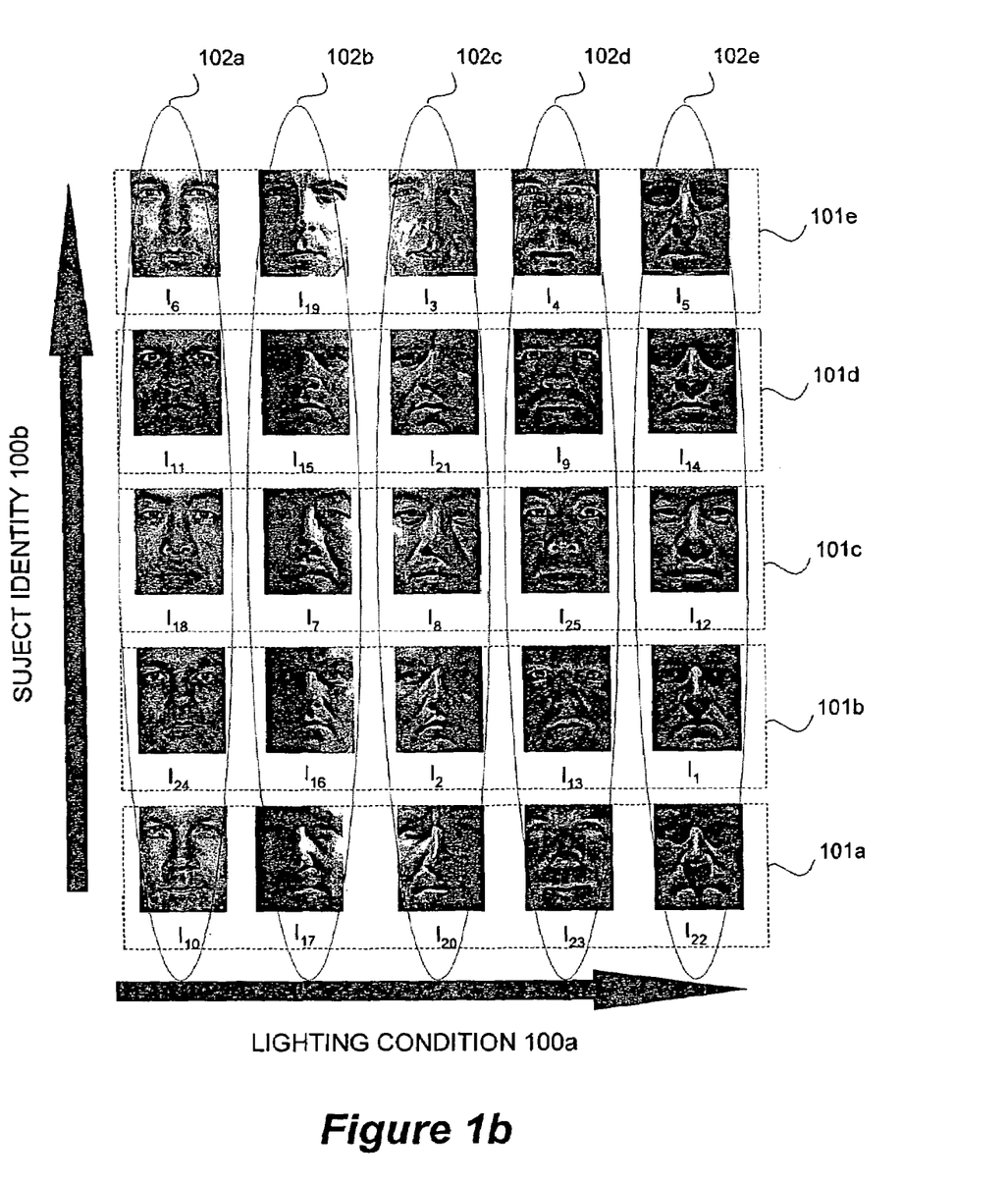
FIG. 1b shows the sample set of images of FIG. 1 clustered both according to lighting condition (columns) and according to subject identity (rows) according to one embodiment of the present invention.

Consider for example the images shown in FIG. 1. There are two natural ways to consider clustering these images: they can be clustered by illumination condition or by identity of the subject. It should be noted that in each such cluster, the shadow formation is more or less the same, and this can be exploited directly by computing some statistics among pixels. Numerous algorithms for estimating lighting direction have been proposed and undoubtedly many of these algorithms can be applied with few modifications to clustering according to lighting. On the other hand, clustering by identity is considerably more difficult when the appearances of a subject class vary dramatically. For example, prior work on face recognition has observed that the appearance variation of the same person under different lighting condition is almost always larger than the appearance variation of different people under the same lighting conditions.

Therefore, it is desirable to provide a system and method that can reliably cluster digital images of subjects taken under various illumination conditions based on the subject's identity.

SUMMARY OF THE INVENTION

In accordance to the present invention, a system, method, and apparatus that include algorithms for clustering digital images of 3-D subjects based on the subject's identity is provided. Generally, the images are acquired at a fixed pose and under varying illumination conditions.

According to one embodiment of the present invention, given a collection or set of digital images, a clustering method comprises evaluating a measure of similarity or affinity between every pair of images in the collection based an underlying structural relationship between the images of a common identity in a multi-dimensional space. The affinity measures between all pairs of images may form the entries in an affinity matrix, and spectral clustering techniques can be applied to yield clusters of images representing the same subject. According to one embodiment of the present invention, several affinity measures exploit an underlying structural relationship between the common identity images to form the basis of different algorithms.

According to another embodiment of the present invention, a method is provided based on the concept of illumination cones. According to this embodiment, the clustering problem is equivalent to finding convex polyhedral cones in the high-dimensional image space representative of the set of images having a common subject, i.e. same subject identity. To efficiently determine the conic structures hidden in the image data, in one embodiment of the present invention, the system can use conic affinity, which measures the likelihood of a pair of images belonging to the same underlying polyhedral cone.

According to another embodiment of the present invention, a system is provided that includes a computer system comprising an input device to receive the digital images, a storage or memory module for storing the set of digital images and a processor for implementing an identity based image clustering algorithm.

According to one embodiment of the present invention, a system computes affinity measures globally in the sense that the affinity between any pair of images is actually determined by the entire collection, a subset of nearest neighbors, or the like. Systems according to the present invention are straightforward to implement and are highly effective when clustering large collections of unlabeled images. Further, systems according to the present invention may operate directly on the images without the need for feature extraction or pixel statistics computation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Referring now to FIGS. 1a and 1b, a set of digital images $I_N$ organized in different ways is shown by way of example. FIG. 1a shows the set of images $I_N$ representing male human faces taken under different illumination conditions as indicated by the shadows and bright spots on the faces. The set images $I_N$ represent different subjects having a distinct identity. In FIG. 1a, the images $I_N$ are randomly arranged.

Conversely, FIG. 1b shows the same set of images $I_N$ but arranged or clustered in several subsets of images $I_{ij}$, where i represents the subjects identity and j represents the illumination condition. In the direction indicated by the arrow for illumination conditions 100a, the images $I_N$ are clustered in columns with similar illumination conditions 102 (102a, 102b, 102c, 102d, and 102e, generally 102j), i.e., the left most column having a front source illumination condition 102a; the next column to the right having a left source illumination condition 102b; the middle column having a right source illumination condition 102c; the next column to the right having a bottom source illumination condition 102d; and the right most column having a top source illumination condition 102e. Hence, for example, the subset $I_{ia}$ all the images taken with a front source illumination condition 102a ($I_6$, $I_{11}$, $I_{18}$, $I_{25}$, and $I_{10}$) are in the first column.

Similarly, the images I are also arranged by identity of the subject 101 (101a, 101b, 101c, 101d, and 101e, generally 101i). In the vertical direction, indicated by the other arrow corresponding to subject identities 100b, the faces are clustered in rows of images $I_N$ representing the same subject 101i. For example, the subset $I_{cj}$ of all the images under various illumination conditions 102j, $I_{18}$, $I_7$, $I_8$, $I_{25}$, and $I_{12}$, representative of the male Asian subject 101c are in the middle row. It should be noted that FIGS. 1a and 1b are shown with images $I_N$ of human faces as the subjects only by way of example. Other subjects can equally be used, such as, for example, geometric shapes (e.g., cubes, spheres, and the like), fruits (e.g., apples, oranges, and the like), animals (e.g., dogs, cats, and the like), even particular breeds of animals, or individual animals, or any other subjects with an identity that can be easily determined in a digital image representation of the subject. The subject's identity 101 is a way to visually distinguish between subjects, or as described below, a common characteristic between various images of one subject that can be mapped to, or otherwise form, a structure in a high-dimensional image space. Referring back to FIG. 1b, it shows two possible bases for clustering images $I_N$ representing subjects: based on illumination conditions 102 and based on subject identity 101.

The set of images $I_N$, can then be represented as having an illumination condition 102j and an identity 101i as an image matrix $I_N = \{I_{ij}\}$, where i is the subject identity {101a, 101b, 101c, . . . , 101m} and j is an illumination condition {102a, 102b, 102c, . . . , 102n}. Hence, for example, referring back to FIG. 1b, image $I_6$ can be represented as $I_{ea}$ being of subject 101e and taken under illumination condition 102a.

As previously discussed, conventional clustering systems would readily identify and easily cluster the set of images $I_N$ based on illumination condition 102 due to the close similarity in illumination condition 102 between the images (i.e., top source, bottom source, left source, right source, or front source). The illumination conditions 102 can easily be approximated by a low dimensional image space, e.g., only four pixels would suffice to determine the illumination condition: a top pixel, a bottom pixel, a left pixel, and a right pixel. The clustering in such equivalent low dimensional image space would consist on grouping the images with similar brightness in each of the four pixels, i.e., left source 102c images $I_3$, $I_{21}$, $I_8$, $I_2$, and $I_{20}$ would have a left bright pixel, a right dark pixel, and top and bottom pixels of approximately equal brightness. In the matrix representation form, these images, $I_3$, $I_{21}$, $I_8$, $I_2$, and $I_{20}$, can be represented as $I_{ec}$, $I_{dc}$, $I_{cc}$, $I_{bc}$, and $I_{ac}$.

However, a system according to the present invention looks beyond this basic similarity measure to a common feature of the images representing the same subject 101 regardless of the illumination condition 102 used. This common feature is typically a spatial relationship in the form of a multidimensional geometric structure 200 of representations of the images in a high-dimensional or multidimensional space $R^S$.

Figure 2:
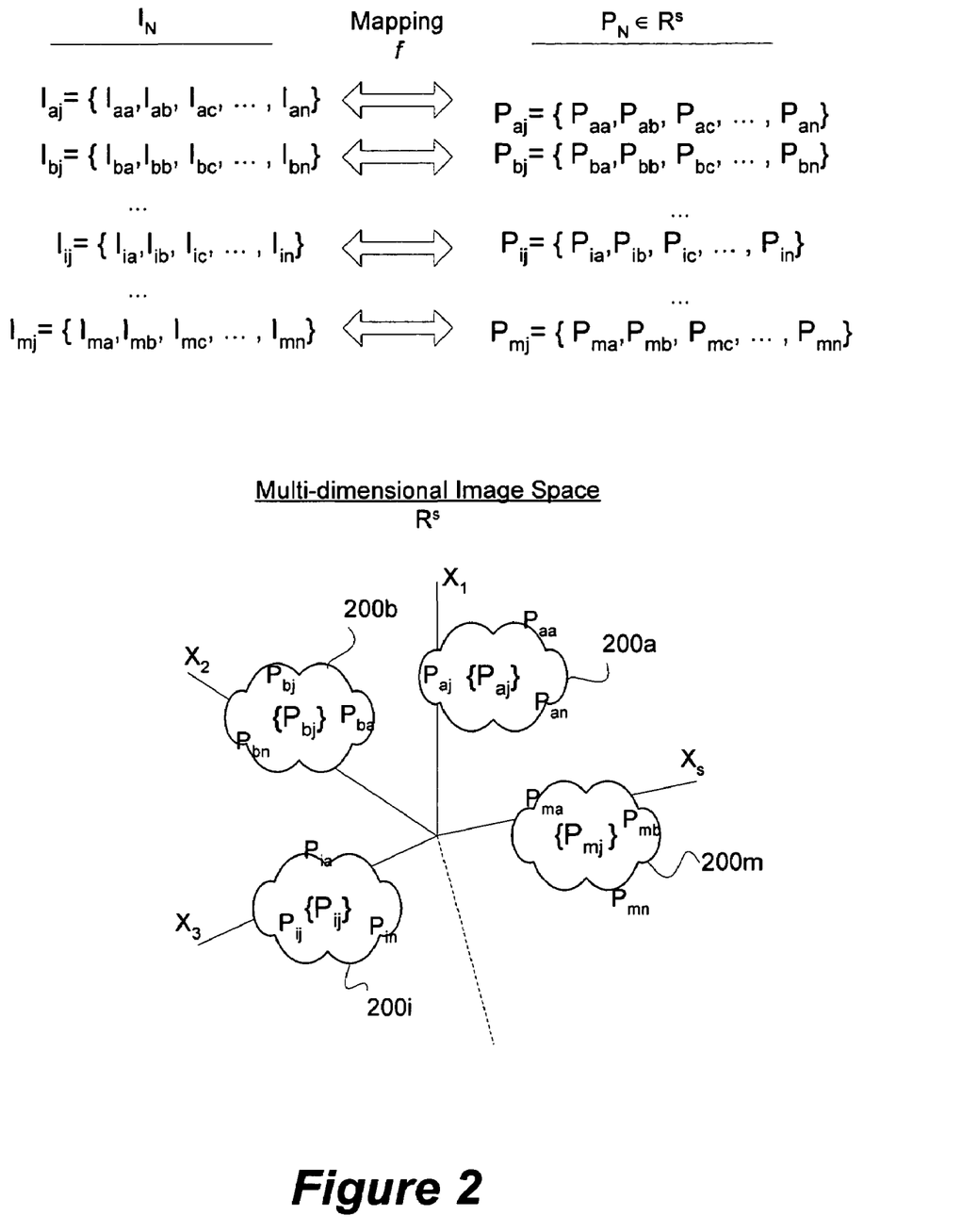
FIG. 2 shows a diagram representing a mapping of the set of images to a multidimensional image space wherein images of the same subject are related by forming a structure in that space according to one embodiment of the present invention.

Now referring to FIG. 2, according to one embodiment of the present invention, the set of images $I_N$, has several clusters or subsets of images $I_{ij}$, each subset of images $I_{ij}$ corresponds to all the images of a subject 101i (for i=a,b,c, . . . , m), each image of the subject 101i taken under a different illumination condition 102j, (for j=a,b,c ..., n). The set of images $I_N$ maps to a set of points $P_N$ in a multi-dimensional image space $R^S$. In this space $R^S$, each subset of images $I_{ij}$ maps to a subset of points $P_{ij}$ that forms a geometric structure 200*i*. The dimension $_S$ of the multidimensional image space $R^S$ is determined by the graphical definition of the digital image, i.e., the number of pixels in the image file. Thus, a set of digital images $I_N$ can be represented as a set of points $P_N$ in a multidimensional image space $R^S$ having $_S$ dimensions $X_1, X_2, \ldots, X_S$ equal to the number of pixels characteristic of the format of the digital image file. The set of images $I_N$ is made up of m subsets of images, $I_{ia}, I_{ib}, \ldots, I_{im}$, each subset $I_{ij}$ made up of all the images I of a same subject 101*i* under n illuminations conditions 102*j*. In that multidimensional space $R^S$, the points P of a subset of points $P_{ij}$ corresponding to the subset of images $I_{ij}$ representing the same subject 101*i* taken under various illumination conditions 102 form a structure 200*i* in that multidimensional space $R^S$. Hence, in the multidimensional space $R^S$ there are m structures 200*a*, 200*b*, ..., 200*m*, each made up of points $P_{ij}$ corresponding to images $I_{ij}$ of the subsets of images $I_{ia}, I_{ib}, \ldots, I_{im}$, representing each subject 101*i*.

A method according to one embodiment of the present invention, takes advantage of the structural relationship among points $P_{ij}$ by composing a set of structure based affinity measures $a_{xy}$. Each affinity measure $a_{xy}$ is representative of a relationship between a pair of digital images, $I_x$, $I_y$, of the set of images $I_N$ with respect to the structure 200*i* in the multidimensional space $R^S$. That is, for each pair of images $I_x$, $I_y$, there can be defined a non-negative number $a_{xy}$, that represents their affinity measure, or affinity. Intuitively, $a_{xy}$ measures how likely it is that $I_x$ and $I_y$ come from the same structure 200*i* in the multidimensional space $R^S$. In the set of images $I_N$, this affinity would correspond to the likelihood that images $I_x$ and $I_y$ belong to the same subset of images $I_{ij}$ representative of the same subject 101*i*. A method according to this embodiment of the present invention operates directly on the underlying geometric structures 200*j* and exploits the hidden geometric structures 200*j* in the image space $R^S$. Therefore, potentially complicated and unreliable procedures, such as, image features extraction or pixel statistics computation, are completely avoided.

Figure 3:
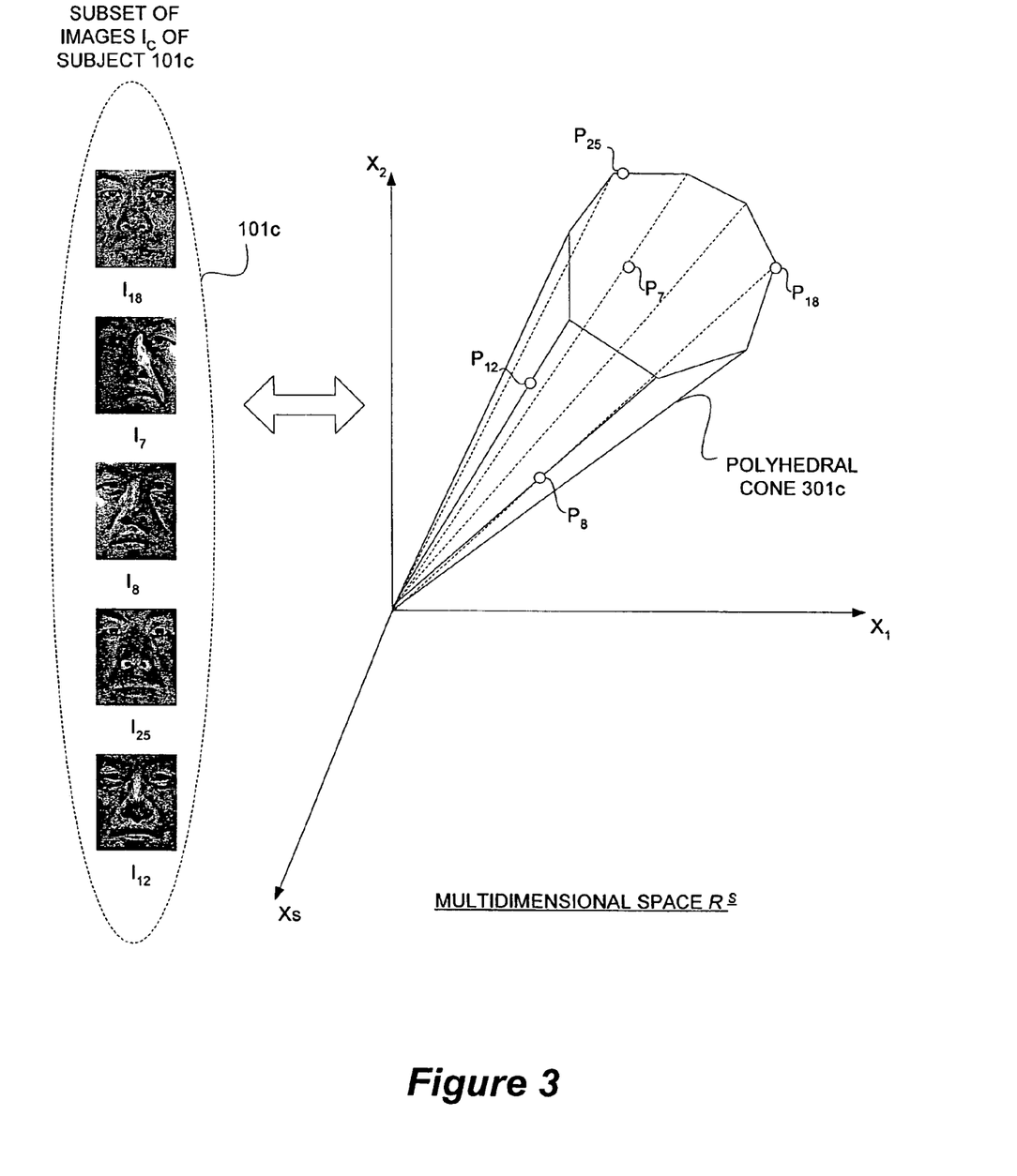
FIG. 3 shows a diagram of a sample mapping of a particular subset of images of a same subject to a polyhedral cone in a multidimensional image space according to one embodiment of the present invention.

Now referring to FIG. 3, according to one embodiment of the present invention, the subset of all images $I_{cj}$ of a Lambertian subject 101*c*, taken under various illumination conditions 102*j*, and with the same pose, forms a convex polyhedral cone 301*c* in the multidimensional image space $R^S$. This relationship is further described in "What is the set of images of an object under all possible lighting conditions" by Belhumeur and Kriegman (Int'l Journal of Computer Vision, vol. 28, p. 245, 1998) incorporated herein by reference in its entirety. Belhumeur "consider . . . the set of images of an object under variable illumination . . . prove that the set of n-pixel images of a convex object with a Lambertian reflectance function, illuminated by an arbitrary number of point light sources at infinity, forms a convex polyhedral cone in $IR^n$ and that the dimension of this illumination cone equals the number of distinct surface normals." Belhumeur also shows that "the cone for a particular object can be constructed from three properly chosen images" and proves that "the set of n-pixel images of an object of any shape and with an arbitrary reflectance function seen under all possible illumination conditions, still forms a convex cone in $IR^n$." Belhumeur, Abstract. Similarly, referring back to the example in FIG. 1*b*, for each subset of images $I_{ij}$ representing a human male 101*i*, there is a convex polyhedral cone 301*i* in the high-dimensional image space $R^S$ in which all the images $I_N$ can be represented as points $P_N$. For example, as it relates to the example in FIG. 1*b*, in that high-dimensional space $R^S$ there are five different cones, one cone containing the high dimensional representations for each row of images of the same subject (101*a* through 101*e*).

It should be noted that a polyhedral cone 301*i* in $R^S$ is mathematically defined by a finite set of generators (or extreme rays) $\{x_1, \ldots, x_n\}$ such that any point $P_1$ in the cone can be written as a linear combination of $\{x_1, \ldots, x_n\}$ with non-negative coefficients. Further, referring now to FIG. 4, this polyhedral cone 301*i* can be approximated well by a lower-dimensional linear subspace 402*i* in a lower dimensional space $R^M$, where $_M<_S$. With these observations in mind, the identity based clustering problem for a collection of images $I_N=\{I_1, \ldots, I_n\}$ representing m subjects can be understood according to the present embodiment of the invention as finding m polyhedral cones 301*i* that best fit the digital image data.

According to one embodiment of the present invention, a system including clustering algorithms is described. The system composes similarity measures between all pairs of images. These similarity or affinity measures are represented in a symmetric N by N matrix $A=(a_{xy})$, i.e., the affinity matrix. The system further implements a spectral clustering method to yield a final set of clusters of images $I_{ij}$ representative of each of the subjects 101*i*.

Figure 4:
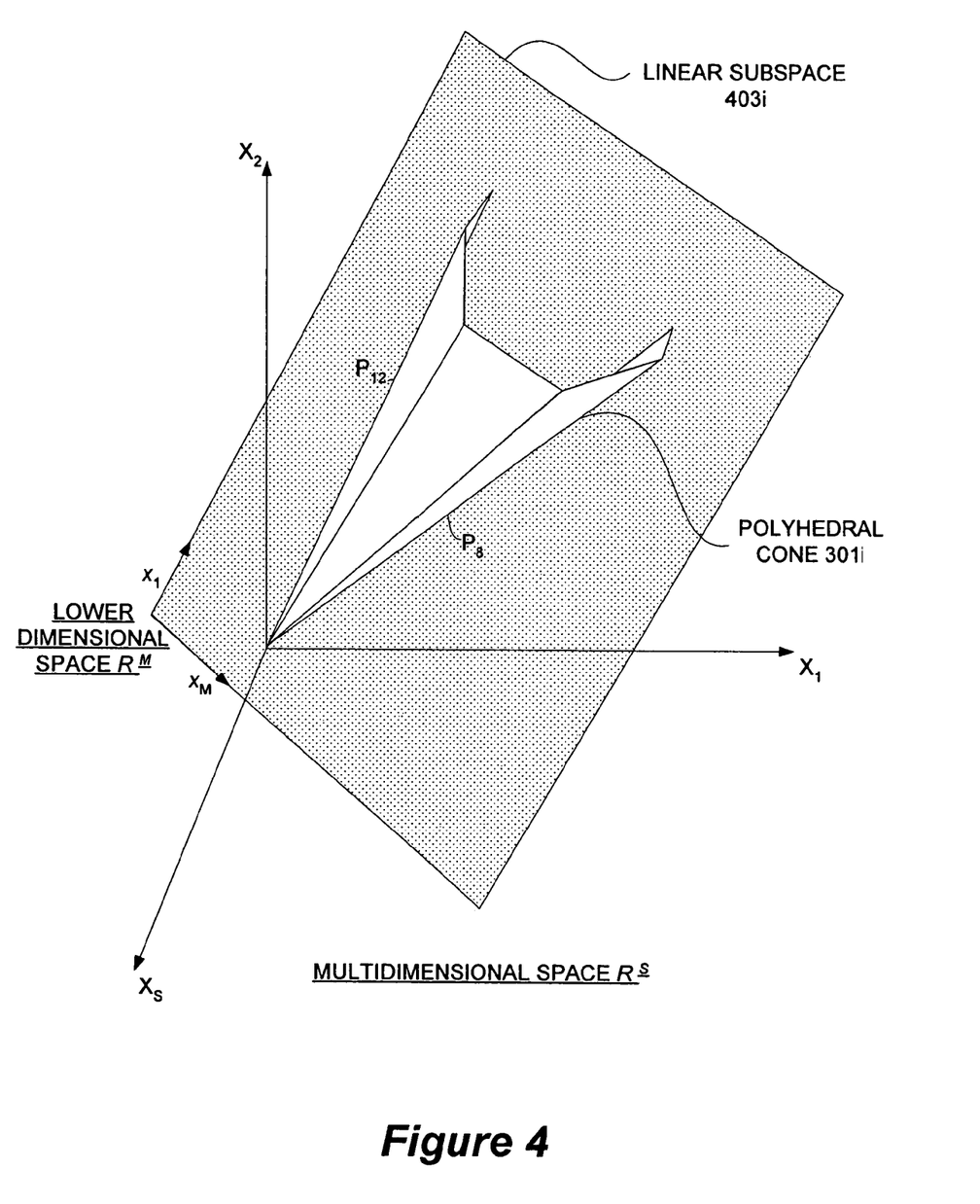
FIG. 4 shows a diagram of a sample low dimensional linear subspace approximating a polyhedral cone form by a particular subset of images of a same subject in a multidimensional image space according to one embodiment of the present invention.

According to one embodiment of the present invention, images from each cluster $I_{ij}$ should be approximated well by some low dimensional linear subspace 402*j*. A K-subspace algorithm is designed specifically to ensure that the resulting clusters have this property. Let $\{I_1, \ldots, I_n\}$ be a collection of unlabeled images $I_N$. For purposes of this embodiment, it should be assumed that the images are taken from N different subjects with Lambertian reflectance. That is, there is an assignment function $\rho:\{I_1, \ldots, I_n\} \rightarrow \{1, \ldots, N\}$. In addition, it should be assumed that for each cluster of images, $\{I_x|\rho(I_x)=z, 1 \leq z \leq N\}$, all images may be taken with the same viewing conditions or pose (i.e., relative position and orientation between the object and the camera). However, the external illumination conditions under which the images, I, are taken may vary widely. Further, all images, I, may have the same number of pixels, s. In the subsequent discussion, n and N will typically denote the number of sample images and the number of clusters, respectively.

According to one aspect of an embodiment of the present invention, conic affinity is defined. Let $P_N=\{x_1, \ldots, x_n\}$ be points in an image space $R^S$ obtained by raster scanning the images. As mentioned above, the clustering problem is equivalent to determining a set of m polyhedral cones 301*i* that best fit the input data. However, it is rather ineffective and inefficient to search for such a set of m polyhedral cones 301*i* directly in the high-dimensional image space $R^S$. Accordingly, one embodiment of the present invention comprises a step of defining a good metric of the likelihood that a pair of points, $x_i$, $x_j$, comes from the same cone 301*i*. In other words, a numerical measure that can detect the conic structure underlying in the high dimensional image space $R^S$. It should be noted that at a fixed pose, a set of images of a convex object under all possible illumination conditions forms a polyhedral cone and any image of the cone can be written as a non-negative linear combination of the cone's generators. For each point $x_i$, we seek a non-negative linear combination of all the other input samples that approximates $x_i$. That is, a set of non-negative coefficients $\{b_{i1}, \ldots, b_{i(i-1)}, b_{i(i+1)}, \ldots, b_{in}\}$ such that $$x_i = \sum_{j \neq i}^{n} b_{ij} x_j \quad (1)$$

in the least square sense, and $b_{ii}=0$ for all i.

Let $\{y_1, \ldots, y_k\}$ be a subset of the collection $P_N$. If $x_i$ actually belongs to the cone generated by this subset, this will imply that $b_{ij}=0$ for any $x_j$ not in the subset. If $x_i$ does not belong to the cone yet lies close to it, $x_i$ can be decomposed as the sum of two vectors $x_i = x_i^c + r_i$ with $x_i^c$ the projection of $x_i$ on the cone and $r_i$, the residue of the projection.

Clearly, $x_i^c$ can be written as a linear combination of $\{y_1, \ldots, y_k\}$ with non-negative coefficients. For $r_i$, because of the non-negative constraint, the non-negative coefficients in the expansion $$r_i = \sum_{j \neq i}^{n} b_{ij}^r x_j \quad (2)$$

will be dominated by the magnitude of $r_i$. This follows from the following simple proposition.

Proposition 2.1 - Let I and $\{I_1, \ldots, I_n\}$ be a collection of images. If I can be written as a linear combinations of $\{I_1, \ldots, I_n\}$ with non-negative coefficients:

$$I = \alpha_1 I_1 + \ldots + \alpha_k I_n \quad (3)$$

where $\alpha_i \geq 0$ for $1 \leq i \leq n$, then $\alpha_i \leq I \cdot I_i$ and $\alpha_i \leq \|I\|/\|I_i\|$.

Therefore, in one embodiment of the present invention, it is expected that the coefficients in the expansion of $x_i$ reflect the fact that if $x_i$ were well-approximated by a cone generated by $\{y_1, \ldots, y_k\}$, then the corresponding coefficients $b_{ij}$ would be large (relatively) while others would be small or zero. That is, the coefficients in the expansion should serve as good indicators of the hidden conic structures according to this embodiment of the invention.

Another important characteristic according to one embodiment of the present invention is that among the non-negative combinations there are only a few coefficients that are significant in magnitude. Typically there are only a few nonzero $b_{ij}$ in Equation 3. This is indeed what has been experimentally observed in one embodiment of the present invention.

According to another aspect of one embodiment of the invention, the coefficients of an affinity matrix A computed with and without non-negative constraints using a set of images $I_N$, e.g., an image database. Similarly, a second matrix B is formed according to this embodiment by taking the coefficients in the expansion in Equation 1 as the entries of $B=(b_{ij})$. Each column of B may be normalized so that the sum is 1. In one embodiment of the present invention, this step ensures that the overall contribution of each input image is the same. By construction, $b_{ij} \neq b_{ji}$ in general, i.e., the B matrix is not symmetric, hence, in this embodiment, B is symmetrized to obtain the affinity matrix $A=(B+B^T)/2$.

According to one embodiment of the present invention, the computational complexity of a proposed algorithm is dominated by the computation of non-negative least square approximation for each point in a collection. In such embodiment, for a collection with a large number of points P, solving the least square approximation for every single element would be time-consuming. Therefore, a parameter m is used, which gives the maximum number of images used in non-negative linear least squares estimation. That is, this embodiment only considers the m closest neighbors of $x_i$ in computing Equation 1. In this embodiment, the distance involved in defining neighbors can be taken to be any similarity measure. For example, the $L^2$-distance metric is sufficient for the clustering task considered in this embodiment of the present invention.

According to an embodiment of the present invention, a proposed algorithm for a clustering system can be summarized as follows:

1. Non-negative Least Square Approximation

Let $\{x_1, \ldots, x_N\}$ be the collection of input samples. For each input sample $x_1$, a non-negative linear least square approximation of $x_1$, may be computed by all the samples in the collection except $x_i$ $$x_i \approx \sum_{j, j \neq i}^{n} b_{ij}^r x_j$$

with $b_{ij} \geq 0 \forall j \neq i$ and setting $b_{ii}=0$. The set $\{b_{i1}, \ldots, b_{ik}\}$ may be normalized with the following equation:

$$b_{ij} = \frac{b_{ij}}{\sum_l b_{il}}$$

(If N is too large, only m closest neighbors of $x_i$ shall be used for the approximation.)

2. Compute Affinity Matrix
   (a) A B matrix may be formed with $B=(b_{ij})$.
   (b) Affinity matrix A may be defined as $A=(B+B^T)/2$.

3. Spectral Clustering
   Using A as the affinity matrix and a standard spectral method for clustering may be applied.

4. (Optional) K-subspace Clustering
   Apply K-subspace clustering to further exploit the linear geometric structures hidden among the images.

In one embodiment of the present invention, a clustering algorithm as described above can be easily implemented with fewer than twenty lines of code in a mathematical programming tool, such as, for example, Matlab® from The Mathworks, Inc, of Natick, Mass. In the present embodiment, an optional K-subspace clustering step, discussed below, can be implemented. Unlike prior methods based on local geometry that exploit the underlying geometric structures in the image space $R^S$, e.g., appearance manifolds, one embodiment of the present invention is based on global characteristics.

In contrast, to cluster these images $I_N$ according to identity of the subject 101$i$, the underlying linear structure 200$i$ is actually a global one. Then, relating back to the examples of FIGS. 1 and 3, the problem becomes finding polyhedral cones 301$i$ for each person 101$i$ in which an image of that person $I_{ij}$ can be reconstructed by a linear combination of basis images (generators of the cone). Given an image $I_x$, an algorithm, according to one embodiment of the present invention, considers all the other images $I_y$ in order to find the set of images $I_{xj}$ (i.e., the ones in the same illumination cone) that best reconstruct $I_x$. It should be noted that this cannot be realized by an approach that simply operates on a pair wise basis rather than on a global basis.

Another aspect according to one embodiment of the present invention includes spectral clustering after the conic affinity measure. This aspect can be implemented with any conventional spectral clustering method, described, for example, in "Pn spectral clustering: Analysis and an algorithm" by Ng, Jordan, and Weiss (Advances in Neural Information Processing Systems 15, p. 849, 2002) incorporated herein by reference in its entirety. Briefly summarized, a known spectral method may consist of the following. Let A be the affinity matrix, and let D be a diagonal matrix where $D_{ii}$ is the sum of i-th row of A. First, A is normalized by computing $M'=D^{-1/2}AD^{-1/2}$. Second, the N largest eigenvectors $w_1, \ldots, w_k$ of M' are computed and a matrix $W=[w_1, w_2, \ldots, w_N] \in \Re^{n \times N}$ (where $\Re^{n \times N}$ is real n×N matrix space) is formed by stacking the column eigenvectors. Then the matrix Y is formed from W by re-normalizing each row of W to have unit length, i.e., $Y_{ij}=W_{ij}/(\Sigma_j W_{ij}^2)^{1/2}$. Each row of Y may be considered a point on a unit sphere in the multidimensional space $\Re^N$. After this transformation, the projected points on the unit sphere should form N tight clusters. These clusters on the unit sphere can then be detected easily by an application of the usual K-means clustering algorithm. We let $\rho(x_i)=z$ (i.e., cluster z) if and only if row i of the matrix Y is assigned to cluster z.

A spectral clustering algorithm according to Ng, et al., which is referenced above, can be summarized as follows: Given a set of points $S=\{s_1, \ldots, s_n\}$ in $\Re^1$ that we want to cluster into κ subsets:

1. Form the affinity matrix $A \in \Re^{n \times n}$ defined by $A_{ij}=\exp(-\|s_{i-sj}\|^2/2\sigma^2)$ if i≠j, and $A_{ij}=0$.
2. Define D to be the diagonal matrix whose (i, i)-element is the sum of A's i-th row, and construct the matrix $L=D^{-1/2}AD^{-1/2}$ 1.
3. Find $x_1, x_2, \ldots, x_1$ the κ largest eigenvectors of L (chosen to be orthogonal to each other in the case of repeated eigenvalues), and form the matrix $X=\in \Re^{n \times k}$ by stacking the eigenvectors in columns.
4. Form the matrix Y from X by renormalizing each of X's rows to have unit length (i.e. $Y_{ij}=X_{ij}/(\Sigma_j X_{ij}^2)^{1/2}$).
5. Treating each row of Y as a point in $\Re^k$, cluster them into k clusters via K-means or any other algorithm (that attempts to minimize distortion).
6. Finally, assign the original point $s_i$ to cluster j if and only if row i of the matrix Y was assigned to cluster j.

(Ng, 2 Algorithm).

Now referring to FIG. 4, another aspect according to one embodiment of the present invention includes the optional K-Subspace clustering. A typical spectral clustering method analyzes the eigenvectors of an affinity matrix of data points where the last step often involves thresholding, grouping or normalized cuts. According to this embodiment of the invention, for the clustering problem, the data points come from a collection of convex cones 301i that can be approximated by low dimensional linear subspaces 402i in a lower dimensional space $R^M$. Therefore, in this embodiment, each cluster $I_{ij}$ may also be well-approximated by some low-dimensional subspace 402i. This peculiar aspect of the problem may be exploited according to this embodiment of the present invention and it can be supplemented with one more clustering step on top of the results obtained from a spectral analysis. An algorithm according to this embodiment of the invention may be a variant of, for example, a conventional K-means clustering algorithm. While a K-means algorithm basically finds K cluster centers using point-to-point distance metric, an algorithm according to this embodiment can find m linear subspaces using point-to-plane distance metric instead for higher accuracy.

A K-subspace clustering algorithm according to one embodiment of the present invention can be summarized as described below. Such an algorithm iteratively assigns points P to a nearest subspace (cluster assignment) and, for a given cluster $\{P_{ij}\}$, it computes a subspace 402i that minimizes the sum of the squares of distance to all points $P_{ij}$ of that cluster $\{P_{ij}\}$ (cluster update). Similar to the K-means algorithm, the K-subspace clustering method typically terminates after a finite number of iterations. This is the consequence of the following two simple observations: (1) there are only finitely many ways that the input data points $P_N$ can be assigned to m clusters $\{P_{ij}\}$ and (2) when defining an objective function (of a cluster assignment) as the sum of the square of the distance between all points $P_{ij}$ in a cluster $\{P_{ij}\}$ and the cluster subspace 402i, it is obvious that the objective function decreases during each iteration.

The result of the K-subspace clustering algorithm according to one embodiment of the present invention depends very much on the initial collection of m subspaces 402i. Typically, as for K-means clustering also, the algorithm only converges to some local minimum, which may be far from optimal. However, after applying the clustering algorithm of one embodiment of the invention, for example, using the conic affinity, a new assignment function ρ', which is expected to be close to the true assignment function ρ, is defined. A system according to this embodiment of the invention uses ρ' to initiate the K-subspace algorithm by replacing the assignment function ρ with ρ' in the Cluster Assignment step of the following methodology. According to one embodiment of the present invention, this K-subspace clustering methodology can be summarized as follows:

1. Initialization
   Starting with a collection $\{S_1, \ldots, S_K\}$ of K subspaces of dimension d, where $S_i \in \Re^S$. Each subspace $S_i$ is represented by one of its orthonormal bases, $U_i$.
2. Cluster Assignment
   An operator $P_i$ is defined as $P_i=I_{dxd}-U_i$ for each subspace $S_i$. Each sample $x_i$ is assigned a new label $\rho(x_i)$ such that $$\rho(x_i)=\arg \min_q \|P_q(x_i)\| \qquad (7)$$

3. Cluster Update
   Let $S_i$ be the scatter matrix of the sampled labeled as i. The eigenvectors corresponding to the top d eigenvalues of $S_i$ are calculated. The eigenvectors corresponding to the top d eigenvalues are the orthonormal basis, $U'_i$ of the $S'_i$. This step continues until $S'_i=S_i$ or else loops to Step 2.

Figure 5:
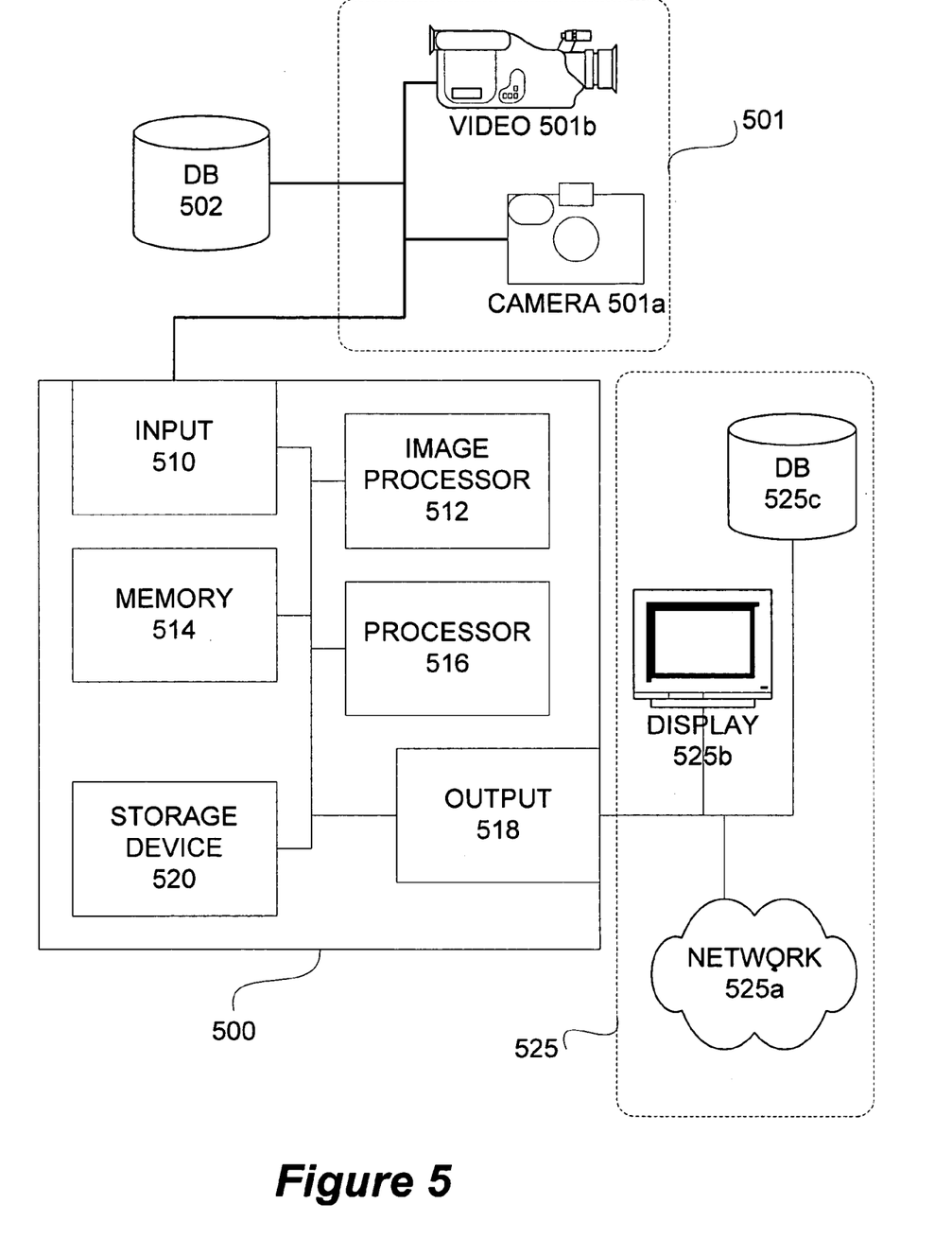
FIG. 5 shows a computer based system according to one embodiment of the present invention.

Now referring to FIG. 5, a system according to one embodiment of the present invention is shown. In one embodiment of the present invention, computer system 500 comprises an input module 510, a memory device 514, a processor 516, and an output module 518. In an alternative embodiment, an image processor 512 can be part of the main processor 516 or a dedicated device to pre-format digital images to a preferred image format. Similarly, memory device 514 may be a stand alone memory device, (e.g., a random access memory chip, flash memory, or the like), or an on-chip memory with the processor 516 (e.g., cache memory). Likewise, computer system 500 can be a stand-alone system, such as, a server, a personal computer, or the like. Alternatively, computer system 500 can be part of a larger system such as for example, a robot having a vision system (e.g., ASIMO advanced humanoid robot, of Honda Motor Co., Ltd., Tokyo, Japan), a security system (e.g., airport security system), or the like.

According to this embodiment, computer system 500 comprises an input module 510 to receive the digital images I. The digital images, I, may be received directly from an imaging device 501, for example, a digital camera 501a (e.g., ASIMO's eyes), a video system 501b (e.g., closed circuit television), image scanner, or the like. Alternatively, the input module 510 may be a network interface to receive digital images from another network system, for example, an image database, another vision system, Internet servers, or the like. The network interface may be a wired interface, such as, a USB, RS 232 serial port, Ethernet card, or the like, or may be a wireless interface module, such as, a wireless device configured to communicate using a wireless protocol, e.g., Bluetooth, WiFi, IEEE 802.11, or the like.

An optional image processor 512 may be part of the processor 516 or a dedicated component of the system 500. The image processor 512 could be used to pre-process the digital images I received through the input module 510 to convert the digital images, I, to the preferred format on which the processor 516 operates. For example, if the digital images, I, received through the input module 510 come from a digital camera 510a in a JPEG format and the processor is configured to operate on raster image data, image processor 512 can be used to convert from JPEG to raster image data.

The digital images, I, once in the preferred image format if an image processor 512 is used, are stored in the memory device 514 to be processed by processor 516. Processor 516 applies a set of instructions that when executed perform one or more of the methods according to the present invention, e.g., affinity measures, K-means clustering, and the like. While executing the set of instructions, processor 516 accesses memory device 514 to perform the operations according to methods of the present invention on the image data stored therein.

Processor 516 arranges the input images, I, into clusters of images, each cluster substantially being of the same subject, and outputs them through the output module 518 to an external device 525 (e.g., a database 525a, a network element or server 525b, a display device 525c, or the like). Like the input module 510, output module 518 can be wired or wireless. Output module 518 may be storage drive interface, (e.g., hard-drive or optical drive driver), a network interface device (e.g., an Ethernet interface card, wireless network card, or the like), or a display driver (e.g., a graphics card, or the like), or any other such device for outputting the clusters of images.

According to yet another embodiment of the present invention, exemplary experimental results are described below. Sample images acquired at frontal view (Top) and a non-frontal view (Bottom) in the Yale database B were used for this exemplary system. Yale database B ("From few to many: Generative models for recognition under variable pose and illumination," by Georghiades, Kriegman, and Belhumeur; IEEE Transactions on Pattern Analysis and Machine Intelligence, 40(6), p. 643, 2001) and the CMU PIE database ("The CMU pose, illumination, and expression (PIE) database," by Sim, Baker, and Bsat; IEEE Int'l Conf. On Automatic Face and Gesture Recognition, p. 53, 2002) are incorporated herein by reference in their entirety. According to this embodiment, numerous experiments using the Yale and the CMU databases can be performed to compare implementations of methods according to embodiments of the invention with other clustering algorithms.

TABLE 1

Clustering results using various methods.
COMPARISON OF CLUSTERING METHODS

| | Error Rate (%) vs. Data Set | | |
|---|---|---|---|
| Method | Yale B (Frontal) | Yale B (Pose) | PIE 66 (Frontal) |
| Conic + non-neg + spec + K-sub | 0.44 | 4.22 | 4.18 |
| Conic + non-neg + spec + K-means | 0.89 | 6.67 | 4.04 |
| Conic + no-constraint + spec + K-sub | 62.44 | 58.00 | 69.19 |
| Gradient aff. | 1.78 | 2.22 | 3.97 |
| Spectral clust. | 65.33 | 47.78 | 32.03 |
| K-subspace | 61.13 | 59.00 | 72.42 |
| K-means | 83.33 | 78.44 | 86.44 |

The Yale database B used for experiments according to one embodiment of the invention comprises two subsets of face images in frontal and pose view. Each subset consists of 450 face images where 45 frames of the same person are acquired under varying lighting conditions. These two subsets are somewhat different, for example, they have different poses at which the images were acquired. Sample images I of two persons were selected from the subsets of the Yale set of images. According to one embodiment of the present invention, each image can be cropped and down-sampled for computational efficiency to, for example, 21×24 pixels (i.e., $s=504$). According to this embodiment, a CMU PIE database consists of a subset of images where frontal view images I of the subjects 101 were taken under different illumination conditions 102 but without background light (see, e.g., PIE 66: each person has 21 visible images an example of which is shown in FIG. 1a). It should be noted that this is a more difficult subset than other subsets in the CMU PIE data set where images I were taken with ambient background light. According to this embodiment of the invention and similarly to the pre-processing with the Yale dataset, each image I is cropped and down-sampled, to fore example, 21×24 pixels (i.e., $s=504$). The large appearance variation of the same person in these data sets makes the face recognition problem rather difficult, and thus the clustering problem can be extremely difficult.

Nevertheless methods included in the present invention achieve very good clustering results, and outperform numerous, known clustering algorithms. Several clustering algorithms with different sets of setups and parameters can be tested with the sample image sets. It should be assumed that the number of clusters, i.e., k, is known according to this particular embodiment of the invention. Spectral clustering algorithms have shown that it is feasible to select an appropriate k value by analyzing the eigenvalues of the matrix. The selection of appropriate k values for clustering is discussed further below. According to this embodiment of the present invention, for the K-means and K-subspace algorithms, the parameters can be empirically tuned and sample experiments can be repeated to get average results since they are sensitive to initialization and parameter selections, especially in the high-dimensional space $R^{504}$.

According to one embodiment of the present invention, Table 1, above, summarizes sample experimental results achieved by different methods: one embodiment of the present invention with a conic affinity method with K-subspace method (conic+non-neg+spec+K-sub), one embodiment of the present invention with a variant a method where K-means algorithm is used after spectral clustering (conic+non-neg+spec+K-means), another embodiment of the present invention with a method using conic affinity and spectral clustering with K-subspace method but without non-negative constraints (conic+no-constraint+spec+K-sub), one embodiment of the present invention with a gradient affinity method (gradient aff.), a straightforward application of spectral clustering where K-means algorithm is utilized as the last step (spectral clust.), a straightforward application of K-subspace clustering method (K-subspace), and a Kmeans algorithm. According to this experimental embodiment, the error rate can be computed based on the number of images that are not clustered to the group of the same identity as the ground truth about each image in these data sets is known.

These sample experimental results suggest a number of conclusions. For example, the results clearly show that methods of the present invention using structural affinity outperform other methods by a large margin; comparing the results on rows 1 and 3, they show that the non-negative constraints play an important role in achieving good clustering results. Similarly, the conic affinity metric of one embodiment of the invention facilitates spectral clustering methods in achieving good results. The use of K-subspace further improves the clustering results after applying conic affinity with spectral methods. Finally, a straightforward application of K-subspace does not work well in the high-dimensional image space.

TABLE 2

Clustering results with high-resolution images according to one embodiment of the invention.
YCOMPARISON OF CLUSTERING METHODS

| | Error Rate (%) vs. Data Set | |
|---|---|---|
| Method | Yale B (Pose) Subjects 1–5 | Yale B (Pose) Subjects 6–10 |
| Conic + non-neg + spec + K-sub | 0.0 | 0.0 |
| Gradient + spec + K-sub | 8.9 | 6.67 |

According to yet another embodiment of the present invention, these metrics can be applied to high-resolution images to further analyze the strength other embodiments of the present invention with conic affinity. The high resolution images can be, for example, 168×184 pixels (i.e., image size before down-sampling in previous experimental embodiment of the invention) which would result in a 30,912 dimensional image space, i.e. $R^{30,912}$. Table 2 shows sample experimental results according to this embodiment using the non-frontal images of the Yale database B. According to this embodiment, for computational efficiency, the Yale database B can be further divided into two sets. The sample results shown in Table 2 suggest that the conic affinity metric with spectral clustering can render near perfect results. This further suggests that computation of gradient metric is more reliable in low-resolution images, which is sufficient for the clustering task according to one embodiment of the present invention.

According to one embodiment of the present invention, a computational load for conic affinity lies in the non-negative least square approximation of the present embodiment. According to this embodiment, when the number of sample images is large, it is not efficient to apply the full algorithm to all the images. Instead, the non-negative least square can be only computed for m nearest neighbors of each image. Sample graphical representations of the effects of m on the clustering results according to one embodiment of the present invention were studied. The experimental results were measured including methods with and without K-subspace clustering on the Yale database B and the PIE database. These sample results suggest that a method according to this embodiment can be robust to a wide range of parameter selection (i.e., number of non-negative coefficients in linear approximation).

As discussed above, the present invention includes several embodiments consisting of appearance-based algorithms for clustering images of 3-D subjects $101i$ under varying illumination conditions $102j$. Unlike other image clustering problems, clustering problems solved by the present invention are highly structured. Experimental embodiments according to the invention suggest that the algorithms are very effective with at least two large data sets. One aspect according to one embodiment of the present invention is that the algorithms described do not require the usual computer vision techniques used in other known methods, such as, the image feature extraction and pixel statistics computation. Clustering algorithms according to embodiments of the present invention and sample experimental results according to experimental embodiments of the present invention complement the earlier results on face recognition techniques. These algorithms, among other things, aim to determine the underlying linear structures $200i$ using only a few training images I. It should be noted that effectively using the limited training images is desirable so that the computed linear structures are close to the real ones. In the some of the embodiments discussed, the linear structures $200i$ are hidden among the input images, and they need to be detected for clustering purposes. Image clustering in general requires an efficient and robust algorithm that can group images according to their identity $101i$ with both pose and illumination variation $102j$.

It should also be noted that while illumination variation $102j$ produces a global linear structure $200i$, the addition of local linear structures introduce meaningful pose variation clustering and are therefore suitable for combining with the present invention to produce a more robust clustering system. A clustering method based on these algorithms can be combined with the algorithms according to embodiments of the present invention to handle both pose and illumination variations. In addition, the teachings of the present invention can also be applied to other non-vision problem domains where, for example, data points are known to be some multidimensional or high-dimensional structures. These and other issues can be addressed from the combinatorial and computational geometry perspective based on the teachings of the present invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. In a set of digital images, each representing a subject having an identity and each digital image having a corresponding illumination condition, wherein a subset of the set of digital images representing a same corresponding subject are related by a mathematical representation of a structure in a multidimensional space, a computer based method for identity based clustering the digital images having various illumination conditions and representing a first subject having a first identity, the method comprising:

composing a set of affinity measures for every pair of digital images in the set of digital images, each affinity measure representative of a relationship between the pair of digital images of the set of images with respect to the structure in the multidimensional space; and applying an identity-based clustering algorithm to the set of affinity measures to determine a first subset of the set of images representing the first subject, wherein the images of said first subset are related by the mathematical representation of the structure in the multidimensional space, and wherein the first identity is undetermined prior to said step of applying the identity-based clustering algorithm.

2. The computer based method of claim 1, further comprising the step of applying a K-subspace clustering to a result of the clustering algorithm to increase accuracy of the identification of the first subset of images.

3. The computer based method of claim 1, wherein the clustering algorithm is a spectral clustering method.

4. The computer based method of claim 1, wherein the structure in the multidimensional space is a convex polyhedral cone.

5. The computer based method of claim 4, wherein the affinity measures are a set of non-negative coefficients of a linear least square approximation of each digital picture, each digital picture approximated as a summation of a linear combination of all other digital pictures in the set of digital pictures.

6. The computer based method of claim 5, wherein the affinity measure is substantially zero for any two digital images representing different subjects.

7. The computer based method of claim 5, wherein the set of affinity measures is represented by an affinity matrix.

8. The computer based method of claim 4, wherein the affinity measures are a set of non-negative coefficients of a linear least square approximation of each digital picture, each digital picture approximated as a summation of a linear combination of a second subset of closest neighboring digital pictures in the set of digital pictures.

9. The computer based method of claim 1, wherein the subjects are human faces.

10. The method of claim 1, wherein each affinity measure is non-negative.

11. The method of claim 1, wherein the identity-based clustering algorithm is based on subject identity.

12. In a set of digital images, each representing a subject having an identity and each digital image having a corresponding illumination condition, wherein a subset of the set of digital images representing a same corresponding subject are related by a mathematical representation of a structure in a multidimensional space, a computer system for identity based clustering the digital images having various illumination conditions and representing a first subject having a first identity, the system comprising:

means for composing a set of affinity measures for every pair of digital images in the set of digital images, each affinity measure representative of a relationship between the pair of digital images of the set of images with respect to the structure in the multidimensional space; and means for applying an identity-based clustering algorithm to the set of affinity measures to determine a first subset of the set of images representing the first subject, wherein the images of said first subset are related by the mathematical representation of the structure in the multidimensional space, and wherein the first identity is undetermined prior to said applying the identity-based clustering algorithm.

13. The computer system of claim 12, wherein each affinity measure is non-negative.

14. An image processing computer system for identifying images representing subjects comprising:

an input module for receiving data representative of a set of digital images, each digital image representative of one subject having an identity;

a memory device coupled to the input module for storing the data representative of the set of digital images;

a processor coupled to the memory device for iteratively retrieving data representative of two images of the set of images, the processor configured to calculate a conic affinity measure between the two digital images, configured to compose an affinity matrix with the conic affinity measures of substantially all the digital images of the set of digital images, and configured to apply an identity-based clustering algorithm to the affinity matrix to determine a subset of digital images corresponding to a same subject having a first identity, wherein the images of said subset are related by a mathematical representation of a structure in a multidimensional space, and wherein the first identity is undetermined prior to said applying the identity-based clustering algorithm.

15. The computer system of claim 14, wherein said conic affinity measure is non-negative.

* * * * *